June 19, 1973  S. R. BOLIN  3,740,261
MODIFIED CZOCHRALSKI GROWN SPINEL SUBSTRATE
BY SOLID STATE DIFFUSION
Filed Feb. 9, 1971
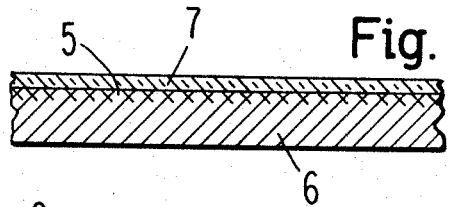
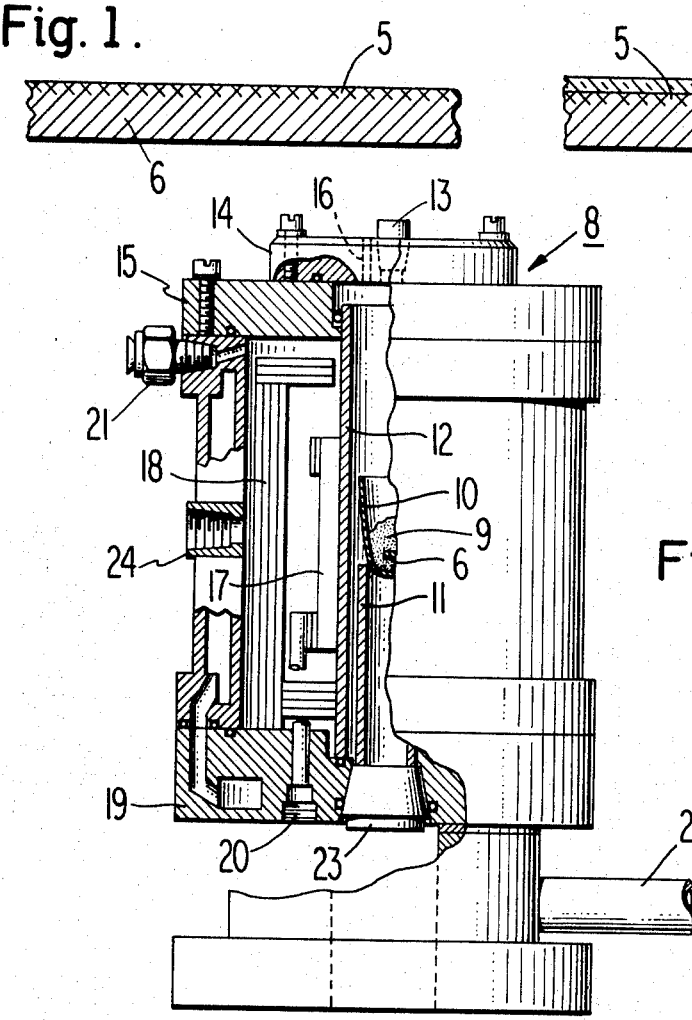
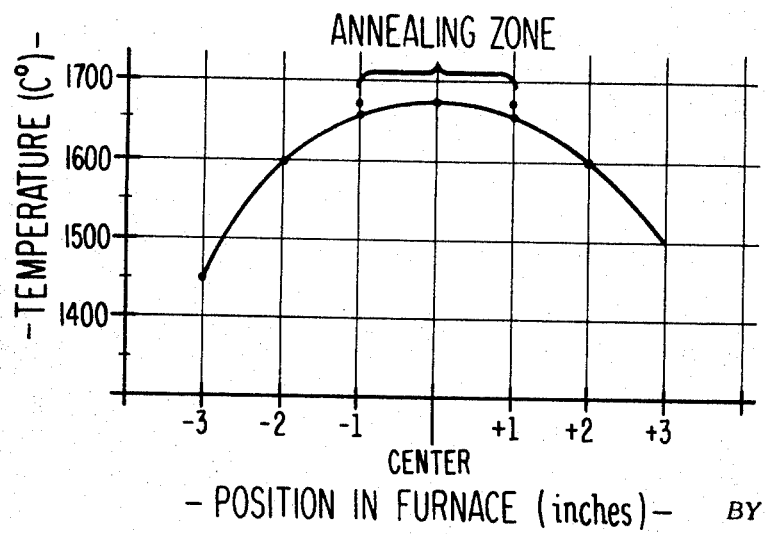
INVENTOR.
Stephen Ray Bolin
BY
W. S. Hill
AGENT

United States Patent Office 3,740,261
Patented June 19, 1973

3,740,261
MODIFIED CZOCHRALSKI GROWN SPINEL SUBSTRATE BY SOLID STATE DIFFUSION
Stephen Ray Bolin, Hightstown, N.J., assignor to RCA Corporation
Filed Feb. 9, 1971, Ser. No. 113,972
Int. Cl. B44d 1/18
U.S. Cl. 117—107.2 P                    3 Claims

ABSTRACT OF THE DISCLOSURE

A modified single-crystal, magnesium aluminate spinel wafer is formed from commercially available spinel by a solid state diffusion of alumina from submicron alumina particles. The resultant wafer is particularly suited for use as an epitaxial silicon substrate. A method is given for producing these modified spinel wafers by solid state diffusion.

BACKGROUND OF THE INVENTION

Field of the invention

This invention relates to a surface-modified magnesium aluminate spinel body, to a method of producing this body, and to an article comprising a substrate wafer composed of the surface-modified spinel material and an epitaxial silicon layer deposited on the modified surface.

DESCRIPTION OF THE PRIOR ART

Recent investigations of the magnesium aluminate spinel systems have shown that they have potential value as substrates for single-crystal silicon deposition. These investigations show a good match between the thermal expansion coefficients of silicon and spinel; however, on commercially avialable Czochralski-grown material, they also reveal problems of chemically reactive surfaces and some evidence of thermal instability during the silicon deposition process. Of the three methods of producing magnesium aluminate spinel, those of flux, Czochralski, and flame fusion crystal growth, the evaluation by C. C. Wang et al. in Technical Report AFML-TR-68-320 entitled, "Single-Crystal Spinel for Electronic Application," for the Air Force Materials Laboratory, Air Force Systems Command, Wright-Patterson Air Force Base, Ohio (1968), indicates that the low alumina-rich, flame-fusion spinel is the preferred substrate for silicon deposition. In similar studies, lead compound flux grown spinel has been shown to invariably contain lead impurities which are difficult to remove prior to silicon deposition and which also inhibit the growth of silicon. On the other hand, however, commercially available Czochralski-grown spinel has been shown to be slightly rich in magnesia and epitaxial silicon deposition on wafers of such crystals has proven to be difficult. Evaluations of single-crystal Czochralski-grown spinel produced from stoichiometric melts show that upon the growth of epitaxial silicon by the method used to deposit silicon on flame-fusion spinel, surface chemical reactions took place and the reactants interfere with growth of the silicon layer. The same researchers also found that silicon applied to low-alumina-rich, flame-fusion spinel introduced in the same silicon growth run did not contain the undesirable surface chemical reaction products.

SUMMARY OF THE INVENTION

This difficulty with Czochralski-grown spinel wafers, attributable to the slight surplus of magnesium ions in the spinel lattice, is circumvented by modifications of the substrate by solid state diffusion of alumina.

OBJECTS OF THE INVENTION

An object of the present invention is to provide an improved Czochralski-grown magnesium aluminate spinel wafer more suitable for the growth of epitaxial silicon layers thereon.

A further object of the present invention is to produce an epitaxial wafer consisting essentially of Czochralski-grown, magnesium aluminate spinel; an alumina-rich surface; and an epitaxially deposited silicon layer.

A further object of the invention is to provide a solid state diffusion method of producing a modified magnesium aluminate spinel surface.

DESCRIPTION OF THE DRAWINGS

FIG. 1 is a cross-sectional view of a magnesium aluminate wafer having an alumina-enriched surface.

FIG. 2 is a cross-sectional view of a magnesium aluminate wafer having an alumina-enriched surface and a layer of epitaxial silicon thereon.

FIG. 3 is a partially cut away cross-sectional view of the furnace used for the alumina-enrichment of magnesium aluminate spinel.

FIG. 4 is a temperature profile of the furnace condition during diffusion of alumina into Czochralski-grown magnesium aluminate spinel wafers.

DESCRIPTION OF A PREFERRED EMBODIMENT

Surface modification of magnesium aluminate spinels is attained by the solid state diffusion process and the resulting articles are shown in FIGS. 1 and 2. The process results in an improved substrate article having alumina 5 enriching the surface of a magnesium aluminate spinel body 6, and an improved combination article comprising a layer of silicon 7 epitaxially deposited on the alumina 5 enriched surface of the magnesium aluminate spinel body 6.

In the preferred form of the method, a resistance furnace 8 is utilized. The furnace 8 includes an inner chamber for the location of material to be fired, in this case, the magnesium aluminate spinel body 6 and alumina powder 9. This inner chamber also provides space for an alumina crucible 10 placed on an alumina pedestal 11. This inner chamber is bounded by a zirconia muffle tube 12 and is equipped with a firing atmosphere gas inlet 13 in the access plate assembly 14 of the cover assembly 15 and a firing atmosphere gas outlet 16 in the access plate assembly 14. The furnace 8 is equipped with an outer chamber having a tungsten heating element 17, molybdenum heat shields 18, and a water jacket 19.

The heating element 17 is contained in an inert gas atmosphere introduced into the cavity through gas inlet 20 and relieved therefrom through gas outlet 21. The furnace also has a water jacket 19 provided with a water inlet 22 and a water outlet (not shown). Other provisions of the furnace 8 are an access port to the muffle tube 12 through a tapered plug 23, a thermocouple assembly 24, and a pyrometer window (not shown).

In the preferred form of the method, the magnesium aluminate spinel body 6 is packed in a high-purity crucible 10 and is surrounded by high-purity alumina powder 9 (approximately $0.6\mu$ diameter and finer). The crucible 10 is then placed on the alumina pedestal 11 in the furnace 8 described above. The inner chamber of the furnace 8 contains a slightly oxidizing atmosphere such as 2% oxygen and the remainder nitrogen. This oxidizing atmosphere is introduced into the furnace 8 through the gas inlet 13 and relieved from the muffle tube 12 through gas outlet 16. The crucible is placed in the region of the muffle tube 12 in which there is the least temperature variation. This location is indicated by the temperature profile for the resistance furnace 8, as shown in FIG. 4. The temperature stability of the furnace 8 is such that the temperature variation from the control temperature between one inch above and one inch below the center of the muffle tube is not greater than 25° C. for a setting of 1600° C. It has been found that placing the crucible in the zone of the furnace in which there is variation of less than 25° C. within that zone is desirable. A series of spinel wafers was packed in crucibles as indicated above and fired in the furnace for a run of 8 hours in duration. Other diffusion runs were conducted for periods of time varying from a period of at least 4 hours to runs as long as 12 hours in duration. Typically, for a diffusion temperature of 1200° C., there is no change in the stoichiometric composition of aluminia-magnesia or in the lattice spacing of the crystalline surface which is 8.08.5 A. However, as indicated by the hole mobilities of epitaxial silicon, as described below, there is some slight alumina enrichment of the magnesium aluminate spinel surface. Diffusion temperatures of 1400° C. and 1600° C. showed very similar results; however, as the fusion temperature of alumina/magnesia is approached, an increasing alumina richness results. Typically, samples were obtained with lattice spacing in the 8.085 to 8.016 A. range with corresponding alumina/magnesia molar ratios of from about 1.05 to 2.0. On two samples where the diffusion temperature was elevated to 1800° C., the lattice spacing was 8.069 and 8.065 A. with increasing alumina/magnesia molar ratio of 1.25 and 1.30, respectively.

Samples of stoichiometric Czochralski spinel that were polished and unpolished have been alumina enriched by the aforementioned solid state diffusion process. The studies by photomicrograph revealed that the reactions on unpolished surfaces are superior and more uniform than those conducted on polished surfaces wherein the reaction sites of diffusion seem to be randomly distributed (with the exception of sites on the edge of the wafer).

On such specially prepared, alumina-enriched spinel surface, a thin film of silicon having a matching lattice orientation is epitaxially deposited. The typical method of epitaxial deposition is that presented in the article entitled, "Epitaxial Growth and Properties of Silicon on Alumina Rich Single Crystal Spinel," by G. W. Cullen, Journal of the Electrochemical Society, October 1969, volume 116, pp. 1444–1449. By this method, which is one of several that may be used, silicon is epitaxially grown on the single crystal spinel surface by the pyrolysis of silane in a hydrogen atmosphere at 1100° C. The hole mobility of $2.0\mu$ thickness of silicon on a wafer diffused with alumina at 1800° C. (having a lattice spacing of 8.069 A. and an alumina/magnesia molar ratio of 1.25) is typically 196 cm.$^2$/V-sec. ($n_a=9.6\times10^{15}$cm.$^{-3}$, $\rho=3.3$ ohm-cm.). On other samples the hole mobility on similar epitaxial silicon depositions was in the range of 170 to 220 cm.$^2$/V-sec. The hole mobility of silicon of flame fusion spinel at the same hole concentration, is typically 300 to 330 cm.$^2$/V-sec. The result for the modified Czochralski-grown spinel epitaxial wafer is approximately ⅔ the mobility in silicon on flame fusion spinel.

What is claimed is:

1. A method of forming an alumina-rich surface on a magnesium aluminate spinel wafer, comprising:
    (a) packing said wafer in high purity alumina powder;
    (b) placing the packed combination of said wafer and said alumina powder in an oxidizing atmosphere; and
    (c) firing said packed combination to a temperature below the fusion temperature of alumina and magnesium aluminate spinel, but at which alumina is diffused across the interface of said alumina powder and said wafer into the surface of said wafer.

2. A method according to claim 1, wherein said firing temperature is at least 1400° C., but below the fusion temperature of alumina and magnesium aluminate spinel.

3. A method according to claim 1, wherein the particulate size of said alumina powder is approximately $0.6\mu$ diameter and finer; and said firing temperature is held for 4 hours to 12 hours.

References Cited

UNITED STATES PATENTS

| | | | |
|---|---|---|---|
| 3,414,434 | 12/1968 | Manasevit | 117—201 |
| 3,424,955 | 1/1969 | Seiter et al. | 317—234 |

OTHER REFERENCES

Allison, J. F., et al.: "Thin-Film Silicon: Preparation, Properties and Device Application," in Proceedings of the IEEE 57 (9), pp. 1490–1498, September 1969.

CAMERON K. WEIFFENBACH, Primary Examiner

U.S. Cl. X.R.

117—201, 213; 148—177, 188